July 31, 1962   H. R. LOWRY   3,047,789
INVERTER CIRCUIT
Filed Nov. 25, 1959

Inventor:
Hugh R. Lowry,
by Henry J. Marciniak
Attorney.

United States Patent Office 3,047,789
Patented July 31, 1962

3,047,789
INVERTER CIRCUIT
Hugh R. Lowry, De Witt, N.Y., assignor to General Electric Company, a corporation of New York
Filed Nov. 25, 1959, Ser. No. 855,439
12 Claims. (Cl. 321—18)

This invention relates to a circuit for converting a direct current into an alternating current supply and more particularly to an improved series inverter circuit for converting direct current into a regulated high frequency alternating current supply.

In many applications it is important that a high frequency current supplied to an electrical device be maintained at a substantially constant level as load requirements of the device and as the power supplied to the circuit vary. Also, it may be required that the high frequency current supply does not exceed a predetermined limit to prevent the possibility of damage to the electrical device. The power supply for high frequency lighting systems is an example of such an application. As lighting fixtures are turned off, the current supplied to the other fixtures must not be increased. Since the fluorescent lamp has a negative resistance characteristic, it is necessary that the current supplied be limited.

Although the advantages accruing from the operation of fluorescent lighting systems at frequencies between 1,000 and 10,000 cycles per second, such as increased lamp efficiency and reduced ballast weight, are recognized, the advantages have not been realized in practice. A principal drawback to the utilization of the higher frequencies has been the high operating costs of the conversion systems employed in the past.

Heretofore, static magnetic frequency multipliers have been used to operate fluorescent lighting systems at a frequency of 360 cycles per second and motor-generator sets have been also used to supply power at 420 cycles per second. The relatively high cost per kilowatt of the magnetic frequency multiplier has prevented its use generally in high frequency lighting systems. Because of their moving parts, motor-generator sets possess an inherent disadvantage in that they require maintenance. Thus, it is desirable that a circuit be developed for supplying a high frequency alternating current supply economically at frequencies above a thousand cycles per second.

Accordingly, a general object of the invention is to provide an improved circuit for supplying high frequency alternating current.

A more specific object is to provide an improved series inverter that can be used to convert a direct current supply to a high frequency alternating current.

It is an object of this invention to provide an improved inverter circuit which will supply a high frequency alternating voltage at a substantially constant level as load requirements vary.

Another object of the invention is to provide an improved inverter circuit which will maintain a substantially constant high frequency voltage or current output as the input to the circuit varies with the normal variations of a commercial power source.

It is still a further object of this invention to provide an improved inverter circuit having a pair of silicon controlled rectifiers in which one of the controlled rectifiers is prevented from firing before the other controlled rectifier has finished a charge or discharge cycle.

These and other objects and advantages in the present invention are achieved by a series inverter circuit comprising two serially connected capacitors and two serially connected controlled rectifiers connected across a pair of direct current input terminal connections, each controlled rectifier being driven by a unijunction transistor of a relaxation oscillator circuit. The frequency of the alternating current output of the circuit is determined by the RC (denoting ohmic resistance and capacitance) time constant of the relaxation oscillator circuit.

According to the present invention, regulation of the voltage or current of the output of the circuit is achieved by diverting current from the relaxation oscillator circuit in order to delay the firing of the controlled rectifiers and thereby decrease the frequency or repetition rate of the inverter circuit. The output voltage or a portion thereof is impressed on a reference diode in the inverter circuit which is so connected that when the impressed voltage becomes greater than the breakdown voltage of the diode, base current flows in a control transistor, causing a large collector current which diverts charging current from the capacitor in the relaxation oscillator which is being charged at the time. Any reduction of the charging rate of the capacitors reduces the repetition rate of the inverter circuit and therefore its power output. Thus, by varying the repetition rate or frequency an effective regulation of the power supply to the load is achieved and only a sufficient amount of power is drawn from the power source by the series inverter to meet the load requirements.

In another aspect of this invention, an arrangement of transistors is provided in the series inverter circuit which prevents one of the controlled rectifiers from firing before the other controlled rectifier has finished its charge or discharge cycle and thereby protects the controlled rectifiers against damage.

The subject matter which I regard as my invention is set forth in the appended claims. The invention itself, however, together with further objects and advantages thereof may be understood by referring to the following description taken in connection with the accompanying drawing in which:

Figure 1:
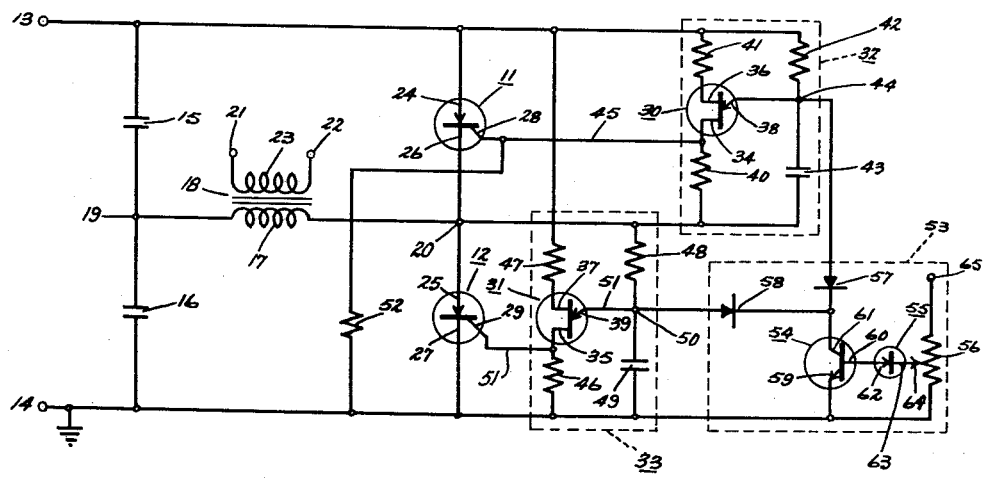
FIG. 1 is a schematic circuit diagram of a series inverter circuit in which the invention is embodied.
Figure 2:
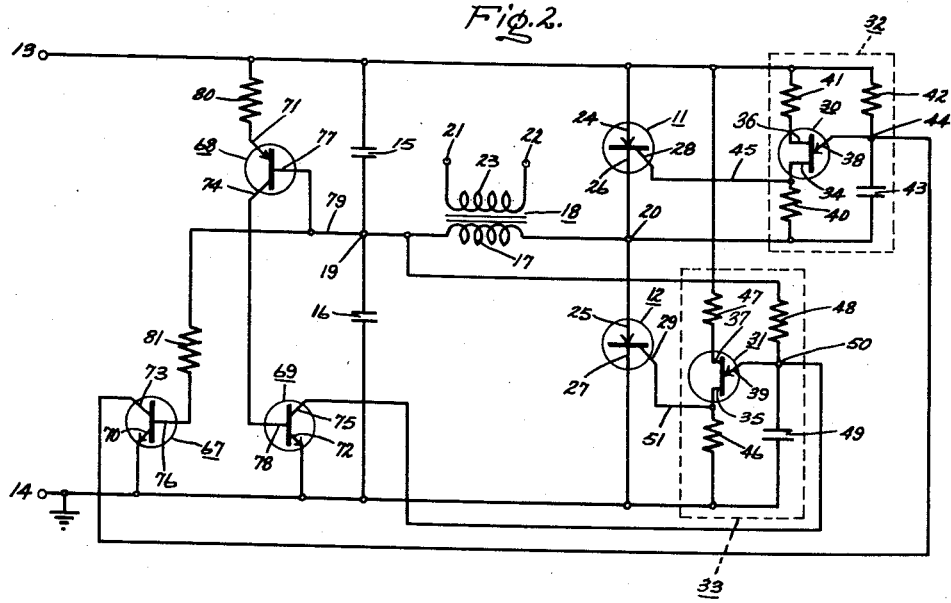
FIG. 2 is a schematic circuit diagram of another series inverter circuit illustrating another embodiment of the invention.

The series inverter circuits shown in FIGS. 1 and 2 include two controlled rectifiers 11, 12 which may be any suitable type of controlled rectifier having an adequate current carrying capacity. In the preferred embodiment of this invention a silicon controlled rectifier is used. The two controlled rectifiers 11, 12 are connected in series across a pair of direct current input terminals 13, 14. The positive terminal 13 and negative terminal 14 connect the circuit to a direct current supply source (not shown) which may be a rectified commercial alternating current source.

A pair of serially connected power capacitors 15 and 16 are connected across the direct current input terminals 13, 14. The primary 17 of a transformer 18 is connected to junction 19 between the capacitors 15, 16 and to junction 20 between controlled rectifiers 11, 12, the junctions 19, 20 serving as alternating current output terminal connections for the circuit. A pair of terminals 21, 22 for a secondary 23 of the transformer 18 are provided for connecting to a load circuit (not shown).

The controlled rectifiers 11, 12 are PNPN semiconductors each having three terminals, the anodes 24, 25, cathodes 26, 27 and gates 28, 29, respectively. It will be understood that the controlled rectifiers 11, 12 can be switched into a high conduction state at an anode-to-cathode voltage less than the breakover voltage by supplying a low level gate-to-cathode current. This characteristic permits the controlled rectifiers 11, 12 to be used to control a substantially large current flow by a low power signal supplied to the gates 28, 29.

The controlled rectifiers 11, 12 are fired by unijunction transistors 30, 31 of relaxation oscillators 32, 33, respectively, which as shown in FIGS. 1 and 2, are enclosed by the rectangles formed by dashed lines. The unijunction transistors 30, 31 have base-one ohmic contacts 34, 35, base-two ohmic contacts 36, 37 and emitters 38, 39, respectively.

The relaxation oscillator 32 includes the unijunction transistor 30 (a resistor 40 connected in circuit with base-one contact 34, a resistor 41 connected in circuit with the base-two contact 36, a serially connected resistor 42 and a capacitor 43 which are joined at a junction 44 connected to the emitter 38. The base-one contact 34 is connected with the gate 28 of the controlled rectifier 11 by a conductor 45. The relaxation oscillator 33 has the same general circuit configuration as oscillator 32 and includes a resistor 46 connected in circuit with the base-one contact 35, a resistor 47 connected in circuit with the base-two contact 37, a serially connected resistor 48 and capacitor 49 which are joined at a junction 50 connected to the emitter 29 of the unijunction transistor 12. The gate 29 of the controlled rectifier 12 is connected by means of a conductor 51 to the base-one contact 35 of the unijunction transistor 31. Thet resistors 41, 47 are provided to limit the base-two to base-one transistor current in the relaxation oscillators 32, 33 to the capabilities of the unijunction transistors 30, 31.

In order to place a back bias on the gate 28 of the controlled rectifier 11, a resistor 52, as shown in FIG. 1, is connected in circuit with the negative input terminal 14 and the gate 28 of the controlled rectifier 11. Placing the resistor 52 in the circuit in this manner reduces the cathode leakage current of the controlled rectifier 11. Unless this leakage current is reduced substantially to zero before controlled rectifier 12 is turned on, the result is a dead short across the line when the controlled rectifier 12 is turned on. Further, it was found that the back bias produced by resistor 52 turns off the controlled rectifier 11 when it is conducting and the current reaches a low point.

It will be noted that after the controlled rectifier 11 has fired and the power capacitors 15, 16 are charged, the cathode 26 of the controlled rectifier 11 will be at a positive voltage. Since the resistor 52 is connected to ground, it will put a back bias on gate 28 of the controlled rectifier 11. However, when the power capacitors 15, 16 are at ground potential, the cathode 26 is at a negative voltage and the resistor 52 has no appreciable effect on the circuit. It was also found that a small choke (not shown) in series with the load or the transformer 18 produces a resonant charging effect that results in placing a back bias on both controlled rectifiers 11, 12 after their conduction cycle and thereby provides a means for a positive turn off.

A regulator circuit 53, which is shown enclosed in a dashed rectangle of FIG. 1, includes a transistor 54, a zener diode 55, a potentiometer 56 and a pair of rectifiers 57, 58. The transistor 54 has an emitter electrode 59, a base electrode 60 and a collector electrode 61. The junctions 44, 50 of the relaxation oscillators 32, 33 are connected in circuit with the rectifiers 57, 58 and the collector electrode 61. The emitter 59 of the transistor 54 is connected in circuit with the negative input terminal 14, and the base electrode 60 is connected to a P-terminal 62 of the zener diode 55. The cathode 63 of the zener diode 55 is connected to an adjustable tap 64 of the potentiometer 56. A feedback terminal 65 is provided to feed back to the regulator circuit 53 a voltage proportional to output voltage, output current or supply voltage.

In the preferred embodiment of this invention diodes used are PN junction type of semiconductor rectifiers. The two diodes 57, 58 serve the purpose of isolating the two relaxation oscillators 32, 33 from each other. It will be apparent that if the diodes were not in the circuit, the junctions 44, 50 of the relaxation oscillators 32, 33 would be directly joined. Thus, the diodes 57, 58 effectively serve to block the flow of current between the RC portions of the relaxation oscillator circuits 32, 33.

The transistor 54 used in the exemplification of this invention is an NPN junction transistor. Since the emitter 59 is connected in circuit with the negative input terminal 14, the output voltage or other signal is applied between the base electrode 60 and the emitter 59, and is reflected in the form of reduced impedance between the collector 61 and the emitter 59.

The zener diode 55 used in the exemplification of the invention is a semiconductor diode, such as a silicon diode, having a predetermined reverse breakdown voltage. For voltages below the breakdown value, the diode 55 acts as a rectifier and only a negligibly small leakage current can flow in the reverse direction. However, when the reverse voltage exceeds the breakdown value, the diode 55 presents a very low resistance and permits current to flow freely in the reverse direction with no substantial increase in voltage.

The operation of the circuits shown in FIGS. 1 and 2 may be explained as follows: When a direct current voltage is first impressed across the terminals 13, 14, neither controlled rectifier 11 nor 12 is conducting. A voltage first appears across the controlled rectifier 11 for an interval of time determined by the RC time constant of the relaxation oscillator 32, during which time the capacitor 43 is being charged. When the charge on capacitor 43 reaches the peak point voltage of the unijunction transistor 30, the transistor 30 assumes a negative resistance characteristic causing the capacitor 43 to discharge. The discharge current of capacitor 43 produces a positive pulse across the resistor 40. This pulse appears at the gate 28 of the controlled rectifier 11 and turns it on. Since the controlled rectifier 11 is no longer in a blocking state, current will flow through the rectifier and the primary 17 of the transformer 18 until the power capacitors 15, 16 are fully charged. The current then flowing through the controlled rectifier 11 will become so low that the controlled rectifier 11 reverts again to a blocking state.

During the conduction period of controlled rectifier 11, the input direct current voltage appears across the resistor 48 and the capacitor 49 of the relaxation oscillator 33. When the capacitor 49 is charged to the peak point voltage of the unijunction transistor, the controlled rectifier 12 is triggered and the power capacitors 15, 16 are discharged through the transformer 18 until they are fully discharged. At this point of the cycle the controlled rectifier 12 returns to a blocking state and one cycle is now completed.

It will be seen that during the half cycle in which controlled rectifier 11 conducts, capacitor 49 of relaxation oscillator 33 is being charged. When the voltage of the capacitor 49 reaches the peak point voltage of transistor 39, the relaxation oscillator 33 supplies the pulse required to trigger the controlled rectifier 12. In order to insure that the controlled rectifier 11 has been cut off prior to the firing of the controlled rectifier 12, the RC constant of the relaxation oscillator 33 should be great enough to permit the controlled rectifier 11 current to go to zero before the controlled rectifier 12 is turned on.

It will be appreciated that by adjusting the values of the resistors 42, 48 and the capacitors 43, 49 of the relaxation oscillators 32, 33 the frequency or repetition rate can be varied. Since available sources of alternating current power can be economically converted to direct current by means of commercially available rectifiers, it will be apparent that the series inverter of the present invention can be readily used in conjunction with such rectifiers to convert a 60 cycle alternating power supply into a high frequency alternating current supply.

Although two power capacitors 15, 16 are employed in the preferred embodiment of the invention, it will be seen that it is possible to operate the circuit according to the present invention with a single capacitor 16. In such a modified circuit, the current pulses drawn from the direct current power supply will be approximately twice as large and will occur half as often thereby imposing a more stringent requirement on the direct current supply. Also, if a single capacitor were used, it would have to be twice as large as one of the capacitors 16 used in the preferred embodiment of the invention.

It is to be understood that the power output of the inverter circuit according to the present invention depends upon the size of the power capacitors 15, 16, the voltage input at the terminals 13, 14 and the frequency of a complete cycle. Variations in load resistance affect the load current wave form but do not have any appreciable effect on the current supplied to the load. Where the inverter circuit of the present invention is used to supply an alternating current to a highly capacitive load, the capacitive load will appear to be a short circuit initially and then later as a finite resistance as the capacitor becomes fully charged. However, such a variable effective resistance does not alter the performance of the inverter circuit with the exception that the root mean square value of the controlled rectifier current is increased.

In accordance with the present invention, power regulation is achieved by a simple circuit arrangement employing a small transistor 54, a zener diode 55 and a pair of rectifiers 57 and 58. When the output voltage is greater than the breakdown voltage of the reference diode 55, a base current flows in the transistor 54. Base current in the transistor 54 will cause a large collector current which diverts the charging current from whichever of the capacitors 43 or 49 of the relaxation oscillators 32 or 33 is positive at the time. A reduction of the charging rate has the effect of increasing the RC time constant and thereby increases the time interval between firing pulses. Thus, the frequency or repetition rate of the circuit is reduced and only sufficient current is supplied to meet the load requirements.

It is to be noted that if the input voltage to the inverter circuit is increased due to a variation in the commercial power supply or if the load resistance is increased, this will result in an increased output voltage which will be fed back to the regulator circuit 53. The output voltage will be regulated by regulator circuit 53 adjusting the charging rates of the relaxation oscillators 32, 33. Accordingly, the series inverter circuit of this invention possesses the advantage that output voltage is not affected by normal variations in a commercial power supply or in the load resistance.

As previously mentioned, the diodes 57, 58 function primarily as rectifiers to block the passage of current between the relaxation oscillators 32 and 33. For proper operation of the relaxation oscillators 32, 33, it is necessary that the junctions 44 and 50 be isolated. If the two diodes 57, 58 are not inserted in the circuit, it is obvious that the two relaxation oscillators 32, 33 would be directly connected with each other.

The potentiometer 56 permits adjustment of the output voltage level at which regulation occurs. If the adjustable tap 64 is moved upward from the connection at the ground side, the zener diode 55 will break down at a lower value of the output voltage because a greater portion of the output voltage is impressed across the diode 55. Thus, as the potentiometer tap 64 is moved upward, the voltage regulation level is reduced and as the potentiometer tap 64 is moved downward, the output voltage regulation level is increased. When the tap 64 is at the uppermost position away from the ground side, the diode 55 is then connected to the full output voltage. It is to be understood that output voltage feedback at terminal 65 must be a direct current voltage. When the load requires an alternating current supply, it will be necessary to rectify the feedback to the regulator circuit 53.

If the voltage across the potentiometer 56 is made proportional to the output current, the regulator circuit 53 will regulate output current and maintain the output current at a substantially constant level. Thus, in applications of the inverter circuit to high frequency lighting systems, the regulation of current is an essential requirement because of the negative resistance characteristic of the fluorescent lamp. For such applications, it would be advantageous to regulate current in accordance with the present invention rather than voltage.

Although only the preferred circuit configuration is shown in FIG. 1, it will be apparent that many modifications to the regulator circuit 53 can be made in accordance with the present invention. The regulator circuit 53 can be simplified by omitting the diodes 57, 58 and connecting the collector 61 of the transistor 54 solely to the junction 50 of the relaxation oscillator 33. Thus, the charging rate of only one of the relaxation oscillators will be affected during regulation of the power output. Consequently, the resulting wave form of the alternating current produced by the inverter during the period of regulation will be unsymmetrical. In applications where the symmetry of the wave form is of little importance, there may be some advantage in using such a modified inverter circuit.

The regulator circuit 53 may also be modified by placing the reference zener diode 55 in circuit with the emitter 59 of the transistor 55 and impressing an initial bias on the reference diode by also connecting the diode to a source of positive voltage. This is a conventional way of achieving better stability where a zener diode is used as a reference diode.

The embodiment illustrated in FIG. 2 is generally similar to the series inverter rectifier circuit shown in FIG. 1 and the corresponding components of the two circuits bear the same reference numerals. It will be noted that FIG. 2 does not include a regulator circuit. In general, the operation of the circuit illustrated in FIG. 2 is substantially the same as the operation circuit of FIG. 1. However, the circuit modifications shown in FIG. 2 are particularly useful where the load variations are so great that a high load resistance may cause either relaxation oscillators 32, 33 to fire one of the controlled rectifiers 11 or 12 before the other has completed its charge or discharge cycle. To insure that the controlled rectifiers 11, 12 will not be turned on at the same time, three transistors 67, 68, 69 are employed in the circuit.

The three transistors 67, 68, 69 are junction type of semiconductors having emitters 70, 71, 72, collectors 73, 74, 75 and base electrodes 76, 77, 78, respectively. The transistors 67, 69 are NPN junction type of transistors while the transistor 68 has a PNP junction.

The base electrode 77 of the transistor 68 is connected to a conductor 79 which joins the junction 19 located between the power capacitors 15, 16. The emitter 71 of transistor 68 is connected in circuit with a protective resistor 80 to the positive side of the direct current supply. The collector 74 of transistor 68 is connected to the base electrode 78 of transistor 69. The emitter 72 of transistor 69 is connected to ground and the collector 75 to the junction point 50 of the relaxation oscillator 33. The base electrode 76 of transistor 67 is connected in circuit with a protective resistor 81 and the junction 19, the emitter 70 is connected to ground and the collector 67 to the junction 44 of the relaxation oscillator 32.

The operation of the transistors 67, 68 and 69 in the series inverter circuit shall now be explained. As long as the junction 19 between the power capacitors 15, 16 is above ground potential, this is an indication that controlled rectifier 12 has not completed its discharging of the power capacitors 15, 16. Also, since the base electrode 76 of the transistor 67 is connected to the junction 19, a positive voltage appears across the base circuit of transistor 67 and base current flows in the transistor 67 causing it to remain in conduction. While in conduction, transistor 67 connects the junction 44 of relaxation oscillator 32 to ground and thereby prevents the capacitor 43 from being charged to peak voltage. So long as the capacitor 43 cannot be charged, the unijunction transistor 30 of the relaxation oscillator 32 cannot fire and turn on controlled rectifier 11.

When the power capacitors 15, 16 are completely discharged, the junction 19 between the power capacitors 15, 16 is essentially at ground potential. Therefore, base current will no longer flow in transistor 67 and the junction 44 of relaxation oscillator 32 will no longer be grounded. The capacitor 43 will then charge to peak voltage and the unijunction transistor 30 will trigger the silicon controlled rectifier 11.

The transistors 68 and 69 prevent controlled rectifier 12 from being fired since junction 50 of the relaxation oscillator 33 is grounded so long as any potential difference exists across the power capacitor 15. A potential difference exists across capacitor 15 as long as controlled rectifier 11 is conducting.

Whenever a potential difference appears across the capacitor 15, a positive voltage appears across the base circuit of the transistor 68 and it remains in conduction. Since the collector 74 of the transistor 68 is connected to the base electrode of transistor 69, a base voltage appears across transistor 69 and it also remains in conduction. When the transistor 69 is in a state of conduction, the junction 50 of relaxation oscillator 33 is grounded and capacitor 49 cannot be charged to a peak voltage. Thus, the two transistors 68, 69 prevent the controlled rectifier 12 from being turned on until controlled rectifier 11 is turned off, as evidenced by the absence of a potential difference across the power capacitor 15.

In accordance with the embodiment of the invention shown in FIG. 2, controlled rectifiers in a series inverter circuit may be protected against the possibility of damage resulting from simultaneous conduction of both rectifiers. Thus, it is possible to use inverters employing silicon controlled rectifiers in regulated power supply circuits furnishing power to a highly variable load.

While I have described above particular embodiments of the invention, it will be apparent that many modifications may be made. It is to be understood, therefore, that I intend by the appended claims to cover all such modifications that fall within the true spirit and scope of the invention.

What I claim as new and desire to secure by Letters Patent of the United States is:

1. An inverter circuit comprising: a pair of direct current input terminal connections; a capacitor connected across said terminal connections; a pair of controlled rectifiers, each of said rectifiers having an anode, a cathode and a gate, the anode of one of said controlled rectifiers being connected in circuit with one of said direct current input terminals and the cathode of the other of said controlled rectifiers being connected in circuit with the other of said direct current input connections; a pair of output terminal connections, one of said output terminal connections being connected in circuit with said capacitor and the other of said output terminal connections being connected in circuit with the cathode of one of said controlled rectifiers and the anode of the other of said controlled rectifiers, said output connections being adapted to provide an alternating current supply of a predetermined frequency; a first relaxation oscillator having a unijunction transistor and a serially connected resistor and capacitor; a second relaxation oscillator having a unijunction transistor and a serially connected resistor and a capacitor, the resistance of said resistors and the capacitance of said capacitors of said first and second oscillators determining the frequency of said alternating supply; and circuit means connecting said first and second relaxation oscillators in circuit with said controlled rectifiers and input terminal connections so that when a direct current is impressed on said input terminal connections one of said relaxation oscillators will fire one of said controlled rectifiers to cause a current flow in one direction to said output terminal connections and to said capacitor connected across said input terminal connections during one-half of the alternating current cycle and the other of said relaxation oscillators will fire the other of said controlled rectifiers to cause a current to flow to said output terminal connections in an opposite direction during the second half of said alternating current cycle by discharging said capacitor connected across said input terminal connections.

2. An inverter circuit comprising: a pair of direct current input terminal connections; a pair of serially connected capacitors connected across said input terminal connections; a first controlled rectifier having an anode, cathode, and gate; a second controlled rectifier having an anode, a cathode and a gate, said first and second controlled rectifiers being serially connected across said input terminal connections; a first output terminal connection connected in circuit with said serially connected capacitors; a second output terminal connection connected in circuit with said serially connected controlled rectifiers, said output connections being adapted to provide an alternating current supply of a predetermined frequency; a first relaxation oscillator including a unijunction transistor and a serially connected resistor and capacitor; a second relaxation oscillator including a unijunction transistor and a serially connected resistor and capacitor; a second of said resistors and the capacitance of said capacitors of said first and second relaxation oscillators determining said frequency of said alternating current supply; and circuit means connecting said first and second relaxation oscillators in circuit with said first and second controlled rectifiers and said input terminal connections so that when a direct current is impressed across said input terminal connections said first relaxation oscillator will fire said first controlled rectifier to cause a current flow in one direction to said input terminal connections and to said capacitors during one-half of a cycle of said alternating current supply, said second controlled rectifier being in a blocking state, and said second relaxation oscillator will fire said second controlled rectifier to cause said capacitors to discharge and provide a current flow in an opposite direction to said output terminal connections during the second half of said cycle, said first controlled rectifier being in a blocking state.

3. An inverter circuit as set forth in claim 1 in which said gate of said first controlled rectifier is connected in circuit with a grounded resistor.

4. An inverter circuit comprising: a pair of direct current input terminal connections; a pair of capacitors serially connected across said input terminal connections; a first and a second controlled rectifier, each having an anode, a cathode and a gate, the anode of said first controlled rectifier being connected in circuit with one of said input terminal connections and the cathode of the second controlled rectifier being connected in circuit with the other of said input terminal connections; a pair of terminal connections for providing an alternating current supply, one of said output terminal connections being connected in circuit with said power capacitors and the other of said output terminal connections being connected in circuit with the cathode of said first controlled rectifier and the anode of said second controlled rectifier; a first relaxation oscillator having a unijunction transistor and a serially connected resistor and capacitor; a second relaxation oscillator having a unijunction transistor and a serially connected resistor and capacitor; circuit means connecting said first and second relaxation oscillators in circuit with said first and second controlled rectifiers and said input terminal connections so that when a direct current is impressed across said input terminal connections said first controlled rectifier is fired by said first relaxation oscillator and the capacitor of said second relaxation oscillator is being provided with a charging current during the first half of the alternating current cycle and during the second half of the cycle said second controlled rectifier is fired by said second relaxation oscillator and said capacitor of said first relaxation oscillator is being provided with a charging current; and means responsive to load voltage connected in circuit with said relaxation oscillators to cause said charging current to be diverted to ground in order to vary the frequency of the alternating current supply at said output terminals and regulate the power supplied.

5. An inverter circuit comprising: a pair of direct current input terminal connections; a pair of serially connected capacitors connected across said input terminal connections; first and second controlled rectifiers connected in series across said input terminal connections; a first output terminal connection in circuit with said serially connected capacitors; a second output terminal connection in circuit with said serially connected controlled rectifiers, said output connections being adapted to provide an alternating current supply to a load; a first and second relaxation oscillator each having a unijunction transistor and a serially connected resistor and capacitor; circuit means connecting said first and second relaxation oscillators in circuit with said first and second controlled rectifiers and said input terminal connections so that when a direct current is impressed across said input terminal connections during the period of the first half of the alternating current said first controlled rectifier is fired by said first relaxation oscillator and the capacitor of said second relaxation oscillator is being provided with a charging current and during the other half of the cycle said second controlled rectifier is fired by said second relaxation oscillator and said capacitor of said first relaxation oscillator is being provided with a charging current; and means responsive to load current connected in circuit with said relaxation oscillators to cause said charging current to be diverted to ground in order to vary the frequency of the alternating current supplied at said output terminal connections and limit the current supplied.

6. An inverter circuit comprising: a pair of direct current input terminal connections; a pair of serially connected capacitors connected across said input terminal connections; first and second controlled rectifiers connected in series across said input terminal connections; a first output terminal connection in circuit with said serially connected capacitors; a second output terminal connection in circuit with said serially connected controlled rectifiers, said output terminal connections being adapted for providing an alternating current supply to a load; a first relaxation oscillator having a first unijunction transistor including a base-one contact, a base-two contact, an emitter and a serially connected resistor and capacitor joined at a first junction, said first junction being joined with said emitter, said base-one contact and base-two contact of said unijunction transistor and said serially connected resistor and capacitor of said first relaxation oscillator being connected in circuit with said input terminal connections and said first controlled rectifier, said base-one contact being connected with said gate of said first controlled rectifier; a second relaxation oscillator having a second unijunction transistor including a base-one contact, a base-two contact and an emitter and a serially connected resistor and a capacitor joined at a second junction, said second junction being connected to said emitter of said second unijunction transistor, said base-one contact and said base-two contact of said second unijunction transistor and said serially connected resistor and capacitor of said second relaxation oscillator being connected in circuit with said input terminal connections and said second controlled rectifier; a regulator circuit including a transistor having a collector, emitter and a base electrode, a zener diode having a predetermined breakdown voltage, and a feedback terminal connection, said zener diode being connected in series circuit relationship with said base electrode and said feedback terminal connection; and circuit means connecting said regulator circuit with at least one of said junctions so that when a voltage greater than the breakdown voltage of said zener diode is impressed at said feedback terminal a charging current is diverted and the frequency of the alternating current supply is decreased.

7. A circuit as set forth in claim 6 in which said first and second junctions are connected to said regulator circuit.

8. An inverter circuit comprising: a pair of direct current input terminal connections; a pair of serially connected capacitors connected across said input terminal connections; first and second controlled rectifiers connected in series across said input terminal connections; a first output terminal connection in circuit with said serially connected capacitors; a second output terminal connection in circuit with said serially connected controlled rectifiers, said output terminal connections being adapted for providing an alternating current supply to a load; a first relaxation oscillator having a first unijunction transistor and a serially connected resistor and a capacitor joined at a first junction; a second relaxation oscillator having a second unijunction transistor and a serially connected resistor and a capacitor joined at a second junction; circuit means connecting said first and second relaxation oscillators in circuit with said first and second controlled rectifiers and said input terminal connections so that when a direct current is impressed across said input terminal connections, during the period of the first half of the cycle of said alternating current supply said first controlled rectifier is fired by said first relaxation oscillator and the capacitor of said second relaxation oscillator is being provided with a charging current and during substantially the other half of the cycle said second controlled rectifier is fired by said second relaxation oscillator and said capacitor of said first relaxation oscillator is being provided with a charging current; a regulator circuit including a transistor having a collector, emitter and a base electrode, a zener diode having a predetermined breakdown voltage, and a feedback terminal connection, said zener diode being connected in series circuit relationship with said base electrode and said feedback terminal connection; circuit means connecting said regulator circuit with at least one of said junctions so that when a voltage greater than the breakdown voltage of said zener diode is impressed at said feedback terminal a charging current is diverted and the frequency of the alternating current supply is decreased; and means provided in said regulator circuit to prevent current flow between said first and second junctions.

9. An inverter circuit comprising: a pair of direct current input terminal connections; a pair of serially connected capacitors connected across said input terminal connections; first and second controlled rectifiers connected in series across said input terminal connections; a first output terminal connection in circuit with said serially connected capacitors; a second output terminal connection in circuit with said serially connected controlled rectifiers, said output terminal connections being adapted for providing an alternating current supply to a load; a first and second relaxation oscillator, each having a unijunction transistor and a serially connected resistor and capacitor; circuit means connecting said first and second relaxation oscillators in circuit with said first and second controlled rectifiers and said input terminal connections so that when a direct current is impressed across said input terminal connections, during the period of the first half of the cycle of said alternating current supply said first controlled rectifier is fired by said first relaxation oscillator and the capacitor of said second relaxation oscillator is provided with a charging current and during substantially the other half of the cycle said second controlled rectifier is fired by said second relaxation oscillator and said capacitor of said first relaxation oscillator is provided with a charging current; means for diverting said charging current of said second relaxation oscillator to ground so long as a potential appears across one of said capacitors serially connected across said input terminal connections to prevent said second controlled rectifier from being fired while said first controlled rectifier is in a conducting state.

10. An inverter circuit as set forth in claim 9 which includes a means for diverting said charging current of said first relaxation oscillator to ground as long as the capacitors serially connected across said input terminal connections are above ground potential to prevent said first controlled rectifier from being fired while said second controlled rectifier is in a conducting state.

11. An inverter circuit comprising: a pair of direct current input terminal connections; a pair of serially connected capacitors connected across said input terminal connections; first and second controlled rectifiers connected in series across said input terminal connections; a first output terminal connection in circuit with said serially connected capacitors; a second output terminal connection in circuit with said serially connected controlled rectifiers, said output terminal connections being adapted for providing an alternating current supply load; a first relaxation oscillator having a first unijunction transistor and a serially connected resistor and a capacitor joined at a first junction; a second relaxation oscillator having a second unijunction transistor and a serially connected resistor and a capacitor joined at a second junction; circuit means connecting said first and second relaxation oscillators in circuit with said first and second controlled rectifiers and said input terminal connections so that when a direct current is impressed across said input terminal connections, during the period of the first half of the cycle of said alternating current supply said first controlled rectifier is fired by said first relaxation oscillator and the capacitor of said second relaxation oscillator is being provided with a charging current and during substantially the other half of the cycle said second controlled rectifier is fired by said second relaxation oscillator and said capacitor of said first relaxation oscillator is being provided with a charging current; and a first, second and third transistor each having a collector, an emitter and a base electrode, said collector of said first transistor being connected to said first junction of said first relaxation oscillator, said emitter being connected to ground and said base electrode being connected in circuit with said first output terminal connection; said emitter of said second transistor being connected in circuit with one of said input terminal connections, said collector being connected in circuit with said base electrode of said third transistor and said base electrode of said second transistor being connected in circuit with said first output terminal connection; and said emitter of said third transistor being connected to ground and said collector being connected in circuit with said second junction of said second relaxation oscillator whereby said controller rectifiers are prevented from simultaneously conducting during operation of the circuit.

12. A circuit as set forth in claim 11 in which said second transistor is of the PNP junction type and said first and third transistors are of the NPN junction type.

References Cited in the file of this patent

UNITED STATES PATENTS 2,473,915    Slepian et al. _____ June 21, 1949